United States Patent [19]

Fujiu et al.

[11] Patent Number: 5,192,723

[45] Date of Patent: Mar. 9, 1993

[54] METHOD OF PHASE TRANSITION, METHOD FOR PRODUCING LEAD NIOBATE-BASED COMPLEX OXIDE UTILIZING SAID PHASE TRANSITION METHOD, AND LEAD NIOBATE-BASED COMPLEX OXIDE PRODUCED BY SAID METHOD

[75] Inventors: Takamitsu Fujiu, Tokyo; Akira Tanaka; Kenichi Muramatsu, both of Kawasaki; Tetsuo Hattori, Yokohama, all of Japan

[73] Assignee: Nikon Corporation, Tokyo, Japan

[21] Appl. No.: 754,015

[22] Filed: Sep. 3, 1991

[30] Foreign Application Priority Data

Sep. 4, 1990 [JP] Japan .................. 2-233871
Apr. 11, 1991 [JP] Japan .................. 3-078909
May 13, 1991 [JP] Japan .................. 3-107320

[51] Int. Cl.$^5$ ............... C04B 35/46; C04B 35/48; C04B 35/49; H01B 1/00
[52] U.S. Cl. ......................... 501/136; 501/134; 501/135; 252/62.9; 252/500; 252/518; 252/521; 423/592; 423/598; 423/622; 423/632; 264/65; 264/66
[58] Field of Search ............... 501/134, 135, 137, 138, 501/136; 252/518, 520, 521, 62.9; 423/592, 598, 593, 594, 622, 632

[56] References Cited

U.S. PATENT DOCUMENTS 4,749,668 6/1988 Fujino et al. .................. 501/134
4,753,905 6/1988 Nishioka et al. .................. 501/136
4,959,333 9/1990 Mori et al. .................. 501/136

FOREIGN PATENT DOCUMENTS 54-35677 11/1979 Japan .
57-25607 2/1982 Japan .
57-27974 2/1982 Japan .

OTHER PUBLICATIONS

Yonezawa et al., "The Crystal Structure and Piezoelectricity of the System $Pb(Zn_\frac{1}{3}Nb_\frac{2}{3})O_3$-$PbTiO_3$", Jun. 3, 1969, Solid and Powder Metallurgy, vol. 16, No. 6, pp. 253–258.

Matsuo, Yoshihiro, "Synthesis of Perovskite-Type Complex Oxide Compound $Pb(Zn_\frac{1}{3}Nb_\frac{2}{3})O_3$," 1970, pp. 46–58.

*Primary Examiner*—Mark L. Bell
*Assistant Examiner*—Michael Marcheschi
*Attorney, Agent, or Firm*—Shapiro and Shapiro

[57] ABSTRACT

A method for producing a lead niobate-based complex oxide with an elevated proportion of pervoskite phase and lead niobate-based complex oxide produced by such method enables manufacture of small actuator or capacitor with an elevated dielectric constant k. Treatment of a raw material represented by a general formula $Pb(A_\frac{1}{2}Nb_\frac{1}{2})x(ZN_\frac{1}{3}Nb_\frac{2}{3})yO_3$ or $Pb(Fe_\frac{1}{2}Nb_\frac{1}{2})x(Zn_\frac{1}{3}Nb_\frac{2}{3})yO_3$ (wherein A is Mg or Ni; x is an atomic ratio in a range of 0–1; and y is an atomic ratio in a range of 1–0, with a relation x+y=1) and containing pyrochlore phase, under a high temperature of 500°–1300° C. and a high pressure of 1000–4000 kg/cm$^2$, causes transition of pyrochlore phase into perovskite phase, thereby increasing the proportion of perovskite phase. Also treatment of a raw material represented by a general formula $uPb(\frac{1}{3}Nb_\frac{2}{3})O_3$-$vPbTiO_3$ (wherein u is an atomic ratio in a range of 0.5–1; and v is an atomic ratio in a range of 0.5–0, with a relation u+v=1) and containing pyrochlore phase, under a high temperature of 500°–1300° C. and a high pressure of 1000–4000 kg/cm$^2$ causes transition of pyrochlore phase into perovskite phase, thereby increasing the proportion of pervoskite phase.

5 Claims, 1 Drawing Sheet

METHOD OF PHASE TRANSITION, METHOD FOR PRODUCING LEAD NIOBATE-BASED COMPLEX OXIDE UTILIZING SAID PHASE TRANSITION METHOD, AND LEAD NIOBATE-BASED COMPLEX OXIDE PRODUCED BY SAID METHOD

BACKGROUND OF THE INVENTION

1. Field of the Invention

The present invention relates to a method for causing transition from perovskite phase to pyrochlore phase, a method for producing a lead niobate-based complex oxide with an increased ratio of perovskite phase utilizing said phase transition method, and a novel lead niobate-based complex oxide with an increased ratio of perovskite phase, produced by said method.

2. Related Background Art

Lead niobate-based complex oxides represented by a general formula (3): $Pb(Zn_{\frac{1}{3}}Nb_{\frac{2}{3}})O_3$ and called PZN, and those represented by a general formula (4): $Pb(Mg_{\frac{1}{3}}Nb_{\frac{2}{3}})O_3$ and called PMN are recently attracting attention as ceramic materials (signifying sintered materails) for producing small actuators capable of submicron displacement and small capacitors. The crystal structure of these oxides can exist in perovskite type or pyrochlore type. Actual PZN or PMN contains both crystal structures in mixed manner, unless it is monocrystalline, and said structures are respectively called perovskite phase and pyrochlore phase.

In both oxides, the perovskite phase shows a high dielectric constant k. In general, the dielectric constant k shows a peak-shaped change as a function of temperature, and the temperature showing highest value of k is called Curie temperature Tc. A material with a high dielectric constant k shows a piezoelectric effect in a temperature region lower than Tc, and an electrostriction effect in a temperature region higher than Tc. PZN, with Tc at 150° C., shows piezoelectric effect at room temperature, while PMN, with Tc at −10° C., shows electrostriction effect at room temperature.

In single crystals, PZN or PMN has been obtained with the ratio of perovskite phase at approximately 100% (namely the ratio of pyrochlore phase approximately 0%).

However, in the sintered material or the raw material powder therefor (generally produced by one-step solid state reaction from metal oxide), PZN has been obtained with the ratio of perovskite phase almost 0%, and PMN has been obtained with said ratio only up to 70-90%.

The ratio of perovskite phase in the powdered or sintered state is important because of the method for producing small actuators or capacitors.

In general, the method for producing small actuators and capacitors consists of mixing powdered PZN or PMN (particle size about 1 μm) with an organic solvent, a resinous binder etc. to obtain slurry, then preparing from said slurry a tape of a thickness for example of 200 μm (so-called green tape) from which the organic solvent is already evaporated, subsequently forming a laminate product by repeating a step of cutting the green tape into a predetermined shape and screen printing electrodes thereon, heating said laminate product at 400°-500° C. to burn off the binder, further sintering the product for example at 1000°-1200° C. and finally attaching external electrodes by heat treatment.

For such method, powdered PZN or PMN is required as the raw material. However the powder obtained by crushing perovskite single crystals cannot be used for such purpose, because the single crystals are extremely expensive.

It was also reported that sintered PZN with a perovskite content of ca. 90% could be directly obtained by a solid-state reaction of powdered mixture of various metal oxides constituting PZN under a high pressure of ca. 25,000 $kg/cm^2$ (cf. Yogyo Kyokaishi, Vol. 78, No. 2, p. 46–58). PZN powder with an elevated ratio of perovskite phase can be obtained by crushing said sintered PZN. However, this method is associated with a drawback of an extremely high production cost, because it requires an ultra-high pressure generating apparatus such as a diamond anvil, and the processed material has to be hermetically sealed in a container for example of platinum.

For this reason, there has been developed a method of forming solid solution of PZN with PMN which can relatively easily assume the perovskite structure, as described in the Japanese Patent Application Laid-Open Nos. 57-25607 and 57-27974. Said solid solution can be produced by sintering a powdered mixture of various metal oxides constituting PZN and PMN for 1–3 hours at 700°–900° C. under atmospheric pressure.

Said solid solution of PZN and PMN is represented by a general formula:

$$Pb(Mg_{\frac{1}{3}}Nb_{\frac{2}{3}})_x(Zn_{\frac{1}{3}}Nb_{\frac{2}{3}})_yO_3 \qquad (5)$$

wherein x is an atomic ratio of 0.4–1 and y is an atomic ratio of 0.6–0 with a relation x+y=1, and contains the perovskite phase in a ratio of 0–90% depending on the value of x or y. It is thus rendered possible to obtain a sintered material containing the perovskite phase from the powder of said solid solution, and to prepare devices of resonable performance by the above-explained method.

However, a lowered proportion of the perovskite phase, whether in PZN or PMN alone or in said solid solution, accordingly reduces the dielectric constant of the sintered material, thereby deteriorating the performance of obtained devices.

Thus, there has also been developed a method of forming solid solution of PZN with $PbTiO_3$ (so-called PT) which assumes perovskite crystal structure, for example as disclosed in "Solid and Powder Metallurgy" Vol. 16, No. 6, p. 253. Said solid solution in monocrystalline state shows maxima of dielectric constant and electromechanical coupling constant and exhibits excellent piezoelectric property in compositions around 0.9PZN-0.1PT. However, in ceramic state, the dielectric constant is lowered and the sintering becomes impossible. This is due to the mixed presence of perovskite and pyrochlore phases in the ceramics of a composition with PZN of 50 mol. % or higher. In the PZN-PT ceramics, a low proportion of the perovskite phase accordingly reduces the dielectric constant of the sintered material, thereby deteriorating the performance of the obtained devices.

Because of the ever increasing requirement for the performance of devices in recent years, it is being longed for to obtain a higher proportion of the perovskite phase in PZN powder, PMN powder, PZN-PMN solid solution and PZN-PT solid solution which are not obtained by crushing the perovskite single crystals but by an ordinary solid phase reaction.

SUMMARY OF THE INVENTION

In consideration of the foregoing, a first object of the present invention is to increase the proportion of the perovskite phase in PZN, PMN and PZN-PMN which are hereinafter collectively called lead niobate-based complex oxides.

A second object of the present invention is to inexpensively produce lead niobate-based complex oxides with an increased proportion of perovskite phase.

Through various investigations, the present inventors have in accordance with a first discovery of the invention, found that conventional PZN, PMN or solid solution thereof, when subjected to a high-temperature and high-pressure treatment under particular conditions described below, causes transition from pyrochlore phase to perovskite phase, thereby showing an increase in the proportion of the perovskite phase, and that a similar increase in the proportion of the perovskite phase can be obtained when Mg in PMN is replaced by Fe or Ni.

Thus, the present invention provides (I) a method of phase transition which comprises treating a raw material represented by a general formula:

$$Pb(A_{\frac{1}{3}}Nb_{\frac{2}{3}})_x(Zn_{\frac{1}{3}}Nb_{\frac{2}{3}})_yO_3 \text{ or}$$

$$Pb(Fe_{\frac{1}{2}}Nb_{\frac{1}{2}})_x(Zn_{\frac{1}{3}}Nb_{\frac{2}{3}})_yO_3 \tag{1}$$

wherein A is Mg or Ni; x is an atomic ratio of 0–1; and y is an atomic ratio of 0–1 with a relation $x+y=1$, and containing at least a pyrochlore phase, under conditions of:

a high temperature in a range of 500°–1300° C., preferably 800°–1200° C. and more preferably 1000°–1200° C.; and a high pressure in a range of 1000–4000 kg/cm², preferably 1000–3000 kg/cm² and more preferably 1300–2000 kg/cm², thereby causing transition of said pyrochlore phase into perovskite phase.

The present invention also provides (II) a method for producing lead niobate-based complex oxide with an increased proportion of perovskite phase, which comprises treating a raw material represented by the above-mentioned general formula (1) and containing at least a pyrochlore phase, under conditions of:

a high temperature in a range of 500°–1300° C., preferably 800°–1200° C. and more preferably 1000°–1200° C.; and a high pressure in a range of 1000–4000 kg/cm², preferably 1000–3000 kg/cm² and more preferably 1300–2000 kg/cm², thereby causing transition of said pyrochlore phase into perovskite phase.

The sintered material of thus obtained complex oxide, or powder obtained by crushing said sintered material is a novel substance that has not been reported in the references, particularly if (1) x is 0–0.4 in atomic ratio, y is 1–0.6 in atomic ratio, and the proportion of perovskite phase is 50% or higher, and (2) x is 0.4–1 in atomic ratio, y is 0.6–0 in atomic ratio and the proportion of perovskite phase is 95% or higher.

The present invention also provides (III) a sintered lead niobate-based composite oxide or powder thereof, represented by a general formula:

$$Pb(A_{\frac{1}{3}}Nb_{\frac{2}{3}})_x(Zn_{\frac{1}{3}}Nb_{\frac{2}{3}})_yO_3 \text{ or}$$

$$Pb(Fe_{\frac{1}{2}}Nb_{\frac{1}{2}})_x(Zn_{\frac{1}{3}}Nb_{\frac{2}{3}})_yO_3 \tag{1}$$

wherein A is Mg or Ni; x is atomic ratio of 0–0.4; and y is atomic ratio of 1–0.6 with a relation $x+y=1$, and having a proportion of perovskite phase of 50% or higher, and (IV) a sintered lead niobate-based composite oxide or powder thereof represented by a general formula:

$$Pb(A_{\frac{1}{3}}Nb_{\frac{2}{3}})_x(Zn_{\frac{1}{3}}Nb_{\frac{2}{3}})_yO_3 \text{ or}$$

$$Pb(Fe_{\frac{1}{2}}Nb_{\frac{1}{2}})_x(Zn_{1.66}Nb_{\frac{2}{3}})_yO_3 \tag{1}$$

wherein A is Mg or Ni; x is atomic ratio of 0–0.4; and y is atomic ratio of 1–0.6 with a relation $x+y=1$, and having a proportion of perovskite phase of 95% or higher.

Among lead niobate-based complex oxides according to (III) an oxide in which A is Mg shows a very high dielectric constant, thus being useful as the raw material for an electrostrictive or piezoelectric member for an actuator, and is advantageously used for forming slurry for the actuator preparation. Thus the present invention also provides a material for electrostrictive or piezoelectric member for an actuator, composed of the aforementioned composite oxide.

In accordance with another discovery of the invention, the present inventors have found that powdered conventional PZN-PT solid solution with a low proportion of perovskite phase, when subjected to a high-temperature and high-pressure treatment under particular conditions described below, causes transition of pyrochlore phase into perovskite phase, thereby achieving an increase in the proportion of the perovskite phase, Thus the present invention provides (V) a method for producing a lead niobate-based complex oxide with an increased proportion of perovskite phase, which comprises treating a material represented by a general formula:

$$uPb(Zn_{\frac{1}{3}}Nb_{\frac{2}{3}})O_3 - vPbTiO_3 \tag{2}$$

wherein u is an atomic ratio of 0.5–1; and v is an atomic ratio of 0–0.5 with a relation $u+v=1$, and having a pyrochlore phase, under conditions of:

a high temperature in a range of 500°–1300° C., preferably 800°–1200° C. and more preferably 1000°–1200° C., and a high pressure in a range of 1000–4000 kg/cm², preferably 1000–3000 kg/cm² and more preferably 1300–2000 kg/cm², thereby causing transition of said pyrochlore phase into perovskite phase.

The present invention also provides (VI) sintered lead niobate-based complex oxide or power thereof, represented by a general formula:

$$uPb(Zn_{\frac{1}{3}}Nb_{\frac{2}{3}})O_3 - vPbTiO_3 \tag{2}$$

wherein u is an atomic ratio of 0.5–1; and v is an atomic ratio of 0–0.5 with a relation $u+v=1$, and having a proportion of perovskite phase of 90% or higher.

The present invention also provides a material for an electrosrictive or piezoelectric member for an actuator, composed of the aforementioned complex oxide.

In the treatment of the present invention, a temperature lower than 500° C. is inadequate because the phase transition becomes difficult, while a temperature higher than 1300° C. is inappropriate because melting takes place.

Also a pressure lower than 1000 kg/cm² is inadequate because the phase transition becomes difficult, while a pressure higher than 4000 kg/cm² is inappropriate because the manufacturing apparatus becomes expensive.

The treatment under high temperature and high pressure is preferably conducted for a duration of 1-5 hours. A period shorter than 1 hour cannot provide sufficient phase transition, while a period longer than 5 hours may not provide desired product because of significant evaporation of lead.

Said treatment is preferably conducted in a hot press or a heated hydrostatic press.

Said high-temperature and high-pressure treatment may be conducted either in an oxygen-containing atmosphere such as a mixture of argon and oxygen, or in an inert gaseous atmosphere such as nitrogen, argon or helium, but is preferably conducted in an inert gaseous atmosphere in consideration of the price of the processing apparatus and the complexity of operations.

The properties of the complex oxide obtained by the method (II) or (V), vary, according to the component and composition of the material represented by the formula (1) or (2). For example, in case A in the formula (1) is Mg, the Curie temperature Tc of the product can be varied from $-10°$ C. close to that of PMN to 150° C. close to that of PZN, by suitable selection of x and y. Consequently the physical properties of the product may be freely selected to show electrostriction (Tc lower than room temperature) or piezoelectric effect (Tc higher than room temperature), or eventually both. Also the maximum dielectric constant $k_{max}$, in case A is Mg, can be varied from 18,000 close to that of PMN to 8,000 close to that of PZN by suitable selection of x and y.

Especially important is a product of (III) with $y=0$-.6-1 in atomic ratio, particularly $y=0.8-1$, in consideration of a fact that sintered PZN with an elevated proportion of perovskite phase has not been available.

Also important is a product of (V) with $u=0.5-1$ in atomic ratio, particularly $u=0.8-1$ in atomic ratio, in consideration of a fact that sintered PZN-PT with PZN of 50 mol % or higher and with an elevated proportion of perovskite phase has not been available.

The starting material used in the method of the present invention can be easily obtained in powdered state, by an ordinary solid-phase reaction, under atmospheric pressure, of powdered mixture of metal oxides constituting said starting material. The product of the present invention is inexpensive since the raw materials are inexpensive.

Also the starting material of the method of the present invention is not limited to powder. If thin plate-shaped material is desired, said material is desirably prepared by a thin film forming method, such as vacuum evaporation, sputtering, CVD, sol-gel method or spin coating, conducted for example on glass, sapphire, ceramics such as magnesia or a metal substrate.

DETAILED DESCRIPTION OF THE PREFERRED EMBODIMENTS

Figure 1:
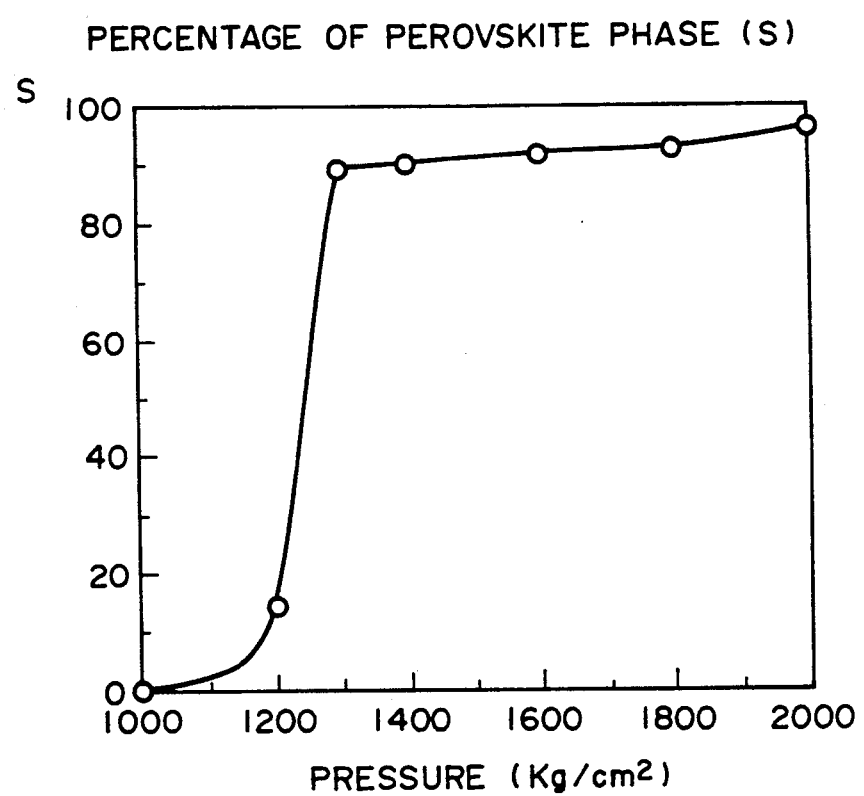
FIG. 1 is a chart showing proportion S of perovskite phase in the product as a function of pressure.

As explained in the foregoing, the present invention has enabled, for the first time, transition of pyrochlore phase into perovskite phase in the compounds or starting materials represented by the general formulas (1) and (2).

Thus, lead niobate-based complex oxides with an elevated proportion of perovskite phase have been obtained for the first time in non-monocrystalline state. Particularly lead niobate-based complex oxides with $y=0.6-1$ in the general formula (1) or $u=0.5-1$ in the general formula (2), having a proportion of the perovskite phase as high as 90%, are novel substances made available for the first time, so that the present invention provides valuable contribution to the related technical fields.

Besides the present invention provides an advantage of low manufacturing cost, as it can utilize a starting material available from a simple solid phase reaction under atmospheric pressure, also as the treatment under high temperature and high pressure featuring the present invention does not require an apparatus for generating an ultra-high pressure such as a diamond anvil, and as the processed material need not be hermetically sealed in a container for example of platinum.

The complex oxide produced according to the present invention has an elevated proportion of perovskite, thereby having a high dielectric constant k and enabling production of devices of excellent performance.

Also the phase transition and the preparation of complex oxide with an increased proportion of perovskite phase according to the present invention may be conducted simultaneously with sintering in the device producing process as long as the conditions of high temperature and high pressure are satisfied. In such case, the manufacturing cost of the devices can be further reduced.

In the following the present invention will be further clarified by reference examples and examples thereof, but it is to be understood that the present invention is by no means limited by such examples.

REFERENCE EXAMPLE 1

PREPARATION OF STARTING MATERIALS

At first PbO, MgO, ZnO and Nb$_2$O$_5$ of chemical purity of at least 99% were weighted in such amounts, calculated on metal atoms only, as to provide Pb, Mg, Zn and Nb corresponding to the compounds of the general formula (1) with one of values of x ($y=1-x$) shown in Table 1, then were placed, together with ethanol solvent, in a zirconia ball mill employing zirconia balls, and were subjected to wet mixing for 20 hours.

Then, after drying by spontaneous evaporation of ethanol, the obtained mixture was transferred to a magnesia crucible, and was heated, with a lid of same material, for 4 hours at 850° C. The obtained powder was sufficiently crushed and baked for 4 hours at 1000° C. to obtain a compound with one of values of x($y=1-x$) shown in Table 1. Said compound was crushed again to an average particle size of about 1 μm to obtain the starting material.

REFERENCE EXAMPLE 2

PREPARATION OF STARTING MATERIALS

On a MgO substrate, a thin film constituting the starting material of the present invention was formed with compositions shown in Table 2 by MOCVD (metal organic CVD) employing Pb(DPM)$_2$, Zn(DPM)$_2$, Mg(DPM)$_2$ and Nb(DPM)$_2$(OC$_2$H$_5$)$_3$ wherein DPM stands for dipyvaloylmethane. The thin film thus obtained was subjected to the measurement of proportion of perovskite phase by thin film X-ray diffractometry.

REFERENCE EXAMPLE 3

PREPARATION OF STARTING MATERIALS

At first PbO, ZnO, TiO$_2$ and Nb$_2$O$_5$ of chemical purity of at least 99% were weighted in such amounts, calculated on metal atoms only, as to provide Pb, Zn, Ti and Nb corresponding to the compounds of the general formula (1) with one of values of x (y=1−x) shown in Table 1, then were placed, together with ethanol solvent in a zirconia ball mill employing zirconia balls, and were subjected to wet mixing for 48 hours.

Then, after drying by spontaneous evaporation of ethanol, the obtained mixture was transferred to an alumina crucible, and heated, with a lid of same material, for 2 hours at 850° C. to obtain a compound with one of values x (y=1−x) shown in Table 1. Said compound was crushed again to an average particle size of about 1 μm to obtain the starting material.

These starting materials were subjected to the measurement of proportion of the perovskite phase by powder X-ray diffractometry (Reference Examples 1 and 3) or thin film X-ray diffractometry (Reference Example 2). Since no other crystal phase than the perovskite and pyrochlore phases was found in all the experimented compositions, the proportion S of the perovskite phase was defined by the following equation, as the ratio of the height $h_{110}$ of the main peak of perovskite phase to the sum of said height and the height $h_{222}$ of the main peak of pyrochlore phase:

$$S = \frac{h_{110}}{h_{110} + h_{222}} \times 100(\%)$$

The proportion of perovskite phase in the present text is defined in this manner.

EXAMPLE 1

PHASE TRANSITION 100 parts by weight of the starting material powder produced in the reference example 1 were added with 5 parts by weight of water, and molded into a cylinder of a diameter of 20 mm and a height of ca. 20 mm, under a molding pressure of 500 kg/cm$^2$.

The molded article was placed in a magnesia crucible, covered with a lid of same material. The crucible was placed in a hot isostatic press (HIP), and was maintained in inert gas atmosphere by the introduction of argon gas. The molded article was pressed with the HIP pressures shown in Table 1, then the temperature was elevated with a rate of 400° C./hr under said pressure, and the HIP temperature shown in Table 1 was maintained for 2 hours.

In this manner there was caused transition from pyrochlore phase to perovskite phase. Thereafter the temperature was lowered to the room temperature with a rate of 600° C./hr under a maximum possible pressure, and the product (lead niobate-based complex oxide) was taken out from the apparatus.

The product was crushed in an agate mortar, and the proportion of perovskite phase was determined by powder X-ray diffractometry. The obtained results are shown in Table 1, in which the experiment No. 6 is a reference example without any pressure.

TABLE 1

Temperature: °C.
Pressure: kg/cm$^2$
S: proportion of perovskite phase
General formula of starting material: 5
Pb(Mg$_1$Nb$_1$) X (Zn$_1$Nb$_1$)$_y$O$_3$

| Exp. No. | Starting material | | High-temperature high-pressure process conditions | | Product (composite oxide) |
|---|---|---|---|---|---|
| | x | S % | HIP temp. | HIP pressure | S % |
| 1 | 1.00 | 86 | 1150 | 1500 | 97 |
| 2 | 0.75 | 73 | 1150 | 1500 | 96 |
| 3 | 0.50 | 42 | 1150 | 2000 | 95 |
| 4 | 0.25 | 18 | 1100 | 2000 | 96 |
| 5 | 0.00 | 0 | 1100 | 2000 | 97 |
| 6 | 0.00 | 0 | 1100 | 1 | 0 |

EXAMPLE 2

PHASE TRANSITION

The material produced in the reference example 2 was placed in a magnesia crucible, covered with a lid of same material, placed in a HIP, maintained in an inert gaseous atmosphere by the introduction of argon gas, then pressed under pressures shown in Table 2, heated with a temperature elevation rate of 400° C./hr, and maintained at the HIP temperatures shown in Table 2 for 2 hours.

Thus there was induced transition from pyrochlore phase to perovskite phase. Then the temperature was lowered with a rate of 600° C./hr. under a maximum possible pressure. The sample after processing was subjected to the measurement of proportion of perovskite phase by thin film X-ray diffractometry. The obtained results are shown in Table 2, in which the experiment No. 6 is a reference example without pressurizing.

TABLE 2

Temperature: °C.
Pressure: kg/cm$^2$
S: proportion of perovskite phase
General formula of starting material: 5
Pb(Mg$_1$Nb$_1$) X (Zn$_1$Nb$_1$)$_y$O$_3$

| Exp. No. | Starting material | | High-temperature high-pressure process conditions | | Product (composite oxide) |
|---|---|---|---|---|---|
| | x | S % | HIP temp. | HIP pressure | S % |
| 1 | 1.00 | 88 | 1150 | 1500 | 97 |
| 2 | 0.75 | 80 | 1150 | 1500 | 94 |
| 3 | 0.50 | 58 | 1150 | 2000 | 93 |
| 4 | 0.25 | 33 | 1100 | 2000 | 90 |
| 5 | 0.00 | 0 | 1100 | 2000 | 92 |
| 6 | 0.00 | 0 | 1100 | 1 | 0 |

EXAMPLE 3

Experiment No. 5 of the example 1 was repeated 7 times under identical conditions, except that the HIP pressure was varied in a range from 1000 to 2000 kg/cm.

The obtained products were crushed in an agate mortar and subjected to the measurement of the proportion S of perovskite phase by powder X-ray diffractometry. The obtained results are shown in FIG. 1.

From these results it will be understood that the phase transition takes place effectively at an HIP pressure of 1300 kg/cm$^2$ or higher.

EXAMPLE 4

100 parts by weight of the powdered material produced in the reference example 3 were added with 5 parts by weight of water, and were molded in a cylinder with a diameter of 20 mm and a height of ca. 20 mm under a molding pressure of 500 kg/cm$^2$.

The molded article was placed in a magnesia crucible, covered with a lid of same material, set in an HIP, maintained in an inert gaseous atmosphere by the introduction of argon gas, then pressed by one of the pressures shown in Table 3, then heated with a temperature elevation rate of 400° C./hr. under same pressure and maintained at one of the HIP temperatures shown in Table 3 for 2 hours.

Thus there was induced transition from pyrochlore phase to perovskite phase. Subsequently the temperature was lowered to the room temperature with a rate of 600° C./hr. under a maximum possible pressure, and the product (lead niobate-based complex oxide) was taken out from the apparatus.

The product was crushed in an agate mortar, and was subjected to the measurement of the proportion of perovskite phase by powder X-ray diffractometry. The obtained results are shown in Table 3, in which the experiment No. 5 is a reference example without pressurization.

TABLE 3

Temperature: °C.
Pressure: kg/cm$^2$
S: proportion of perovskite phase
General formula of starting material: 2
uPb(Zn$_\frac{1}{3}$Nb$_\frac{2}{3}$)O$_3$-vPbTiO$_3$

| No. | u | v | Temperature | Pressure | S |
|---|---|---|---|---|---|
| 1 | 0.9 | 0.1 | 1200 | 2000 | 90 |
| 2 | 0.8 | 0.2 | 1200 | 2000 | 96 |
| 3 | 0.6 | 0.4 | 1200 | 2000 | 97 |
| 4 | 0.5 | 0.5 | 1200 | 2000 | 97 |
| 5 | 0.9 | 0.1 | 1200 | 1 | 0 |

What is claimed is:

1. A method of producing a lead niobate-based complex oxide which comprises treating a raw material represented by a general formula:

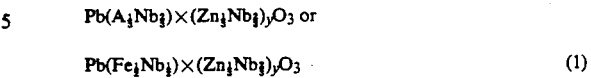

wherein A is Mg or Ni; x is an atomic ratio within a range of 0–1; and y is an atomic ratio within a range of 1–0 with a relation x+y=1, and containing pyrochlore phase, under conditions of:

a high temperature in a range of 500°–1300° C. and a high pressure in a range of 1000–4000 kg/cm$^2$ thereby causing transition of said pyrochlore phase into perovskite phase.

2. A method of producing lead niobate-based complex oxide, which comprises treating a raw material represented by a general formula:

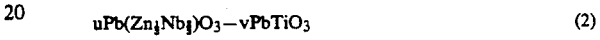

wherein u is an atomic ratio in a range of 0.5–1; and v is an atomic ratio in a range of 0–0.5 with a relation u+v=1, and containing pyrochlore phase, under conditions of:

a high temperature in a range of 500°–1300° C.; and a high pressure in a range of 1000–4000 kg/cm$^2$, thereby causing transition of said pyrochlore phase into perovskite phase.

3. A method of producing lead niobate-based complex oxide according to claim 1 or 2, wherein the proportion of perovskite phase is equal to or higher than 90%.

4. A method of producing lead niobate-based complex oxide according to claim 1 or 2, wherein the treatment under high temperature and high pressure is conducted in a hot isostatic press.

5. A method according to claim 1 or 2, wherein said treatment under high temperature and high pressure is conducted in inert gas.

* * * * *